United States Patent
Borghi

(10) Patent No.: US 7,172,523 B2
(45) Date of Patent: Feb. 6, 2007

(54) AUTOMATIC MECHANICALLY CONTROLLED CONTINUOUSLY-VARIABLE-RATIO DRIVE

(75) Inventor: Gianni Borghi, Albinea (IT)

(73) Assignee: Lombardini S.R.L. A Socio Unico, Adelmo Lombardini (IT)

( * ) Notice: Subject to any disclaimer, the term of this patent is extended or adjusted under 35 U.S.C. 154(b) by 460 days.

(21) Appl. No.: 10/691,160

(22) Filed: Oct. 22, 2003

(65) Prior Publication Data
US 2004/0082415 A1  Apr. 29, 2004

(30) Foreign Application Priority Data
Oct. 25, 2002 (IT) ........................... TO2002A0931

(51) Int. Cl.
F16H 59/00 (2006.01)
B60W 10/10 (2006.01)

(52) U.S. Cl. ............................ 474/13; 474/14; 474/12; 192/3.54

(58) Field of Classification Search ............ 474/12–17, 474/29–30, 19, 25, 42; 192/3.53, 3.52
See application file for complete search history.

(56) References Cited

U.S. PATENT DOCUMENTS 2,512,816 A * 6/1950 Sweger .................. 192/3.53
2,556,512 A   6/1951 Ammon
3,830,112 A * 8/1974 Ward ..................... 474/13
4,608,885 A * 9/1986 Koivunen ............... 475/210
6,520,878 B1 * 2/2003 Leclair et al. ............ 474/14
2002/0017440 A1 * 2/2002 Borghi et al. ........... 192/3.54
2002/0034995 A1 * 3/2002 Borghi ................... 474/29

FOREIGN PATENT DOCUMENTS

| EP | 0898096 A1 | 2/1999 | |
| EP | 1132656 A2 | 9/2001 | |
| EP | 1160490 A1 | 12/2001 | |
| GB | 2129072 A | 5/1984 | |
| GB | 2165599 A * | 4/1986 | ............ 474/13 |
| WO | WO 98/48198 A2 * | 1/1998 | |

* cited by examiner

Primary Examiner—Marcus Charles
(74) Attorney, Agent, or Firm—Ladas and Parry LLP

(57) ABSTRACT

A continuously-variable-ratio drive, having an input shaft; a flywheel integral with the input shaft; a drive pulley idle with respect to the input shaft and defined by two half-pulleys defining a groove of variable size for a V belt; and a centrifugal control assembly. The control assembly has a centrifugal actuating device which intervenes above a first threshold value of the angular speed of the input shaft to connect the drive pulley angularly to the flywheel by means of a friction clutch; and a speed adjusting device which is active over a second threshold value of the angular speed of the input shaft to adjust the size of the groove of the drive pulley and therefore the work diameter of the belt.

8 Claims, 4 Drawing Sheets

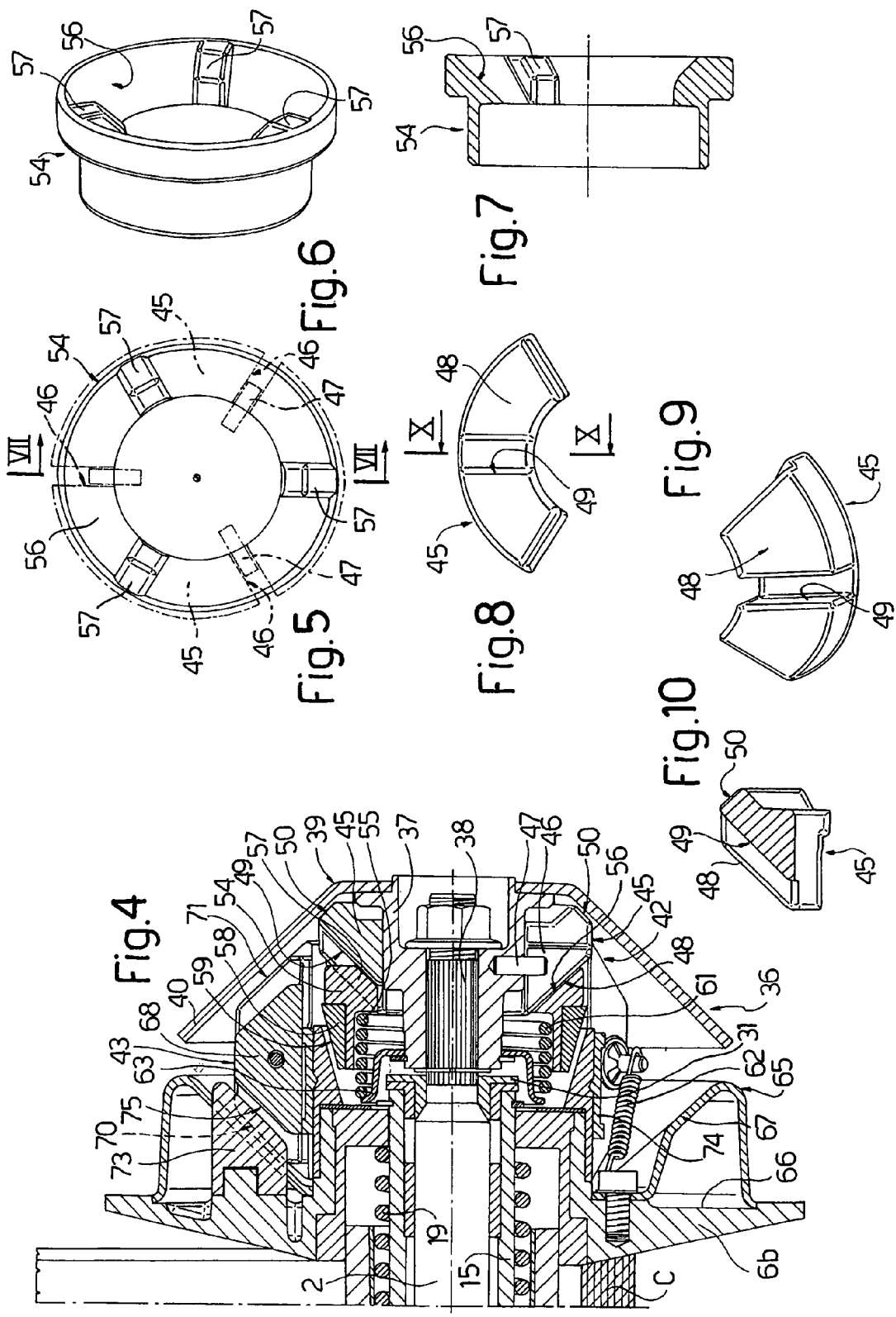

AUTOMATIC MECHANICALLY CONTROLLED CONTINUOUSLY-VARIABLE-RATIO DRIVE

FIELD OF THE INVENTION

The present invention relates to an automatic mechanically controlled continuously-variable-ratio drive, particularly for a vehicle.

The present invention relates to an automatic mechanically controlled continuously-variable-ratio drive, particularly for a vehicle.

BACKGROUND OF THE INVENTION

Drives of the above type are known, which substantially comprise an input shaft; and a drive pulley connectable to the input shaft and comprising two half-pulleys defining a V groove of variable size to adjust the winding diameter of a V belt. The pulley is located between a clutch disk connected rigidly to the input shaft, and a disk-pusher plate angularly integral with but sliding axially with respect to the input shaft.

In automatic mechanical control solutions, friction linings are interposed between the half-pulleys and the clutch disk and disk-pusher plate respectively, and a centrifugal control device cooperates with the disk-pusher plate to move it axially towards the pulley by an amount varying as a function of the speed of the shaft.

More specifically, in one known solution, the control device comprises a hub fixed rigidly to the shaft; and a number of centrifugal weights carried by the hub and for centrifugally exerting axial thrust on the disk-pusher plate, so as first to connect the pulley to the input shaft by means of the friction linings, and then gradually reduce the distance between the half-pulleys as the angular speed of the input shaft increases.

Known drives of the type briefly described above are used widely in low-power motorcycles, in particular scooters, but, though used frequently, have various drawbacks in higher-power applications, such as so-called microcars.

In particular, irregular response of the control device to variations in shaft speed, i.e. to the accelerator, results in "jerking" when accelerating and decelerating, and which is especially noticeable at low engine speed, when starting and parking.

Another drawback of known drives is relatively severe wear of the belt, caused by the belt slipping with respect to the half-pulleys at start-up, when the axial thrust exerted on the half-pulleys by the control device is low.

SUMMARY OF THE INVENTION

It is an object of the present invention to provide a continuously-variable-ratio drive for a vehicle, designed to eliminate the aforementioned drawbacks of known drives.

According to the present invention, there is provided a drive as claimed in claim 1.

BRIEF DESCRIPTION OF THE DRAWINGS

A preferred, non-limiting embodiment of the present invention will be described by way of example with reference to the accompanying drawings, in which:

FIG. 4 shows an axial section of the drive assembly in a different plane from the FIGS. 2 and 3 sections;

FIG. 5 shows a face view of a first component of the drive;

FIG. 6 shows a view in perspective of the FIG. 5 component;

FIG. 7 shows a section along line VII—VII in FIG. 5;

FIG. 8 shows a face view of a second component of the drive;

FIG. 9 shows a view in perspective of the FIG. 8 component;

FIG. 10 shows a section along line X—X in FIG. 8.

DETAILED DESCRIPTION OF THE INVENTION

Figure 1:
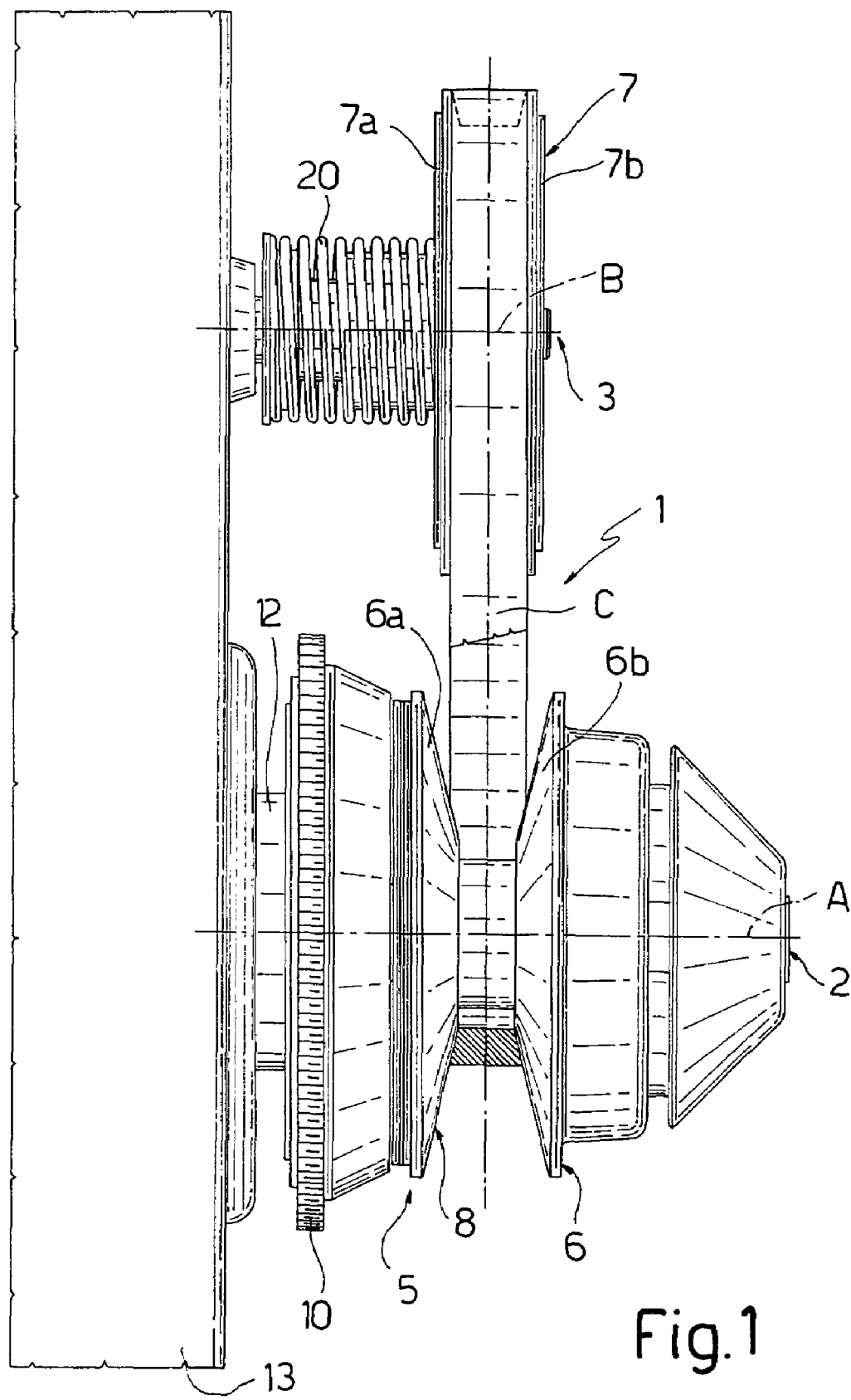
FIG. 1 shows a side view of a drive in accordance with the present invention and in a first operating position.

Number 1 in FIG. 1 indicates as a whole an automatic mechanically controlled variable-ratio drive for a vehicle, e.g. a scooter or microcar.

Drive 1 comprises an input shaft 2 of axis A; an output shaft 3 of axis B parallel to axis A; a drive assembly 5 fitted to input shaft 2 and having a drive pulley 6 connectable to input shaft 2; and a driven pulley 7 fitted to output shaft 3.

Pulleys 6 and 7 are defined respectively by two half-pulleys 6a, 6b and 7a, 7b defining respective grooves 8 of variable size for a V belt C.

Input shaft 2 is connected rigidly to a flywheel 10 in turn fixed to a drive shaft 12 of an engine 13 (shown partly) of the vehicle.

More specifically (FIGS. 2 and 3), drive assembly 5 comprises a sleeve 15 fitted idly and with a limited amount of axial slide to input shaft 2. A first half-pulley 6a is fixed rigidly to an end flange 16 of sleeve 15 facing flywheel 10, and is therefore hereinafter referred to as "fixed half-pulley 6a"; and half-pulley 6b (hereinafter referred to as "movable half-pulley 6b") is fitted in axially sliding but angularly fixed manner to sleeve 15, e.g. by a splined coupling 17.

Groove 8 defined by half-pulleys 6a, 6b varies in width alongside variations in the axial position of movable half-pulley 6b, so as to vary the work diameter of belt C; and axial slide of movable half-pulley 6b along sleeve 15 is limited, in the direction away from fixed half-pulley 6a, by a stop ring 18 on the axial end 19 of sleeve 15 opposite flange 16.

Movable half-pulley 6b therefore slides axially between a contact position contacting ring 18 (FIGS. 1 and 2) and corresponding to the minimum work diameter of belt C, and a maximum-approach position as close as possible to fixed half-pulley 6a (top half of FIG. 3) and corresponding to the maximum work diameter of belt C.

A helical spring 19, externally coaxial with sleeve 15, is compressed axially between half-pulleys 6a and 6b to keep movable half-pulley 6b against ring 18 in the absence of external control thrust. The axial position of ring 18 is selected to keep belt C in contact with both half-pulleys 6a, 6b, with no axial slack, and therefore taut.

Belt C (FIG. 1) transmits motion to driven pulley 7, which is reactive; and half-pulleys 7a, 7b are loaded axially towards each other in known manner by a spring 20, so as to automatically adapt the work diameter in the opposite way to that of pulley 6.

A clutch disk 24 is fitted in angularly free manner to flange 16 of sleeve 15, is interposed axially between flywheel 10 and fixed half-pulley 6a, and has two peripheral annular friction face seals 25, 26 respectively facing a clutch surface 14 of flywheel 10 and a clutch surface 27 of fixed half-pulley 6a. Clutch disk 24 is kept permanently contacting clutch surface 27 by an annular spring 28, e.g. with an undulated or cup-shaped profile, interposed axially between clutch disk 24 and a shoulder 29 of flange 16.

Clutch disk 24 defines, with clutch surfaces 14 and 27, a friction clutch 32 interposed between flywheel 10 and drive assembly 5.

Sleeve 15 of drive assembly 5 is supported in rotary and axially free manner on input shaft 2 by means of two bushings 30. Drive assembly 5 is subjected to the axial thrust of a spring 34 surrounding input shaft 2 and compressed between a shoulder 35 of input shaft 2 and drive assembly 5 itself—more specifically, a push ring 33, which slides along input shaft 2 and rests axially against flange 16 of sleeve 15, so as to keep seal 25 of clutch disk 24 detached from clutch surface 14 of flywheel 10. A flange 31 fitted to input shaft 2 defines the limit position of drive assembly 5 produced by spring 34, so that a minimum axial clearance S is defined between seal 25 and clutch surface 14.

Figure 2:
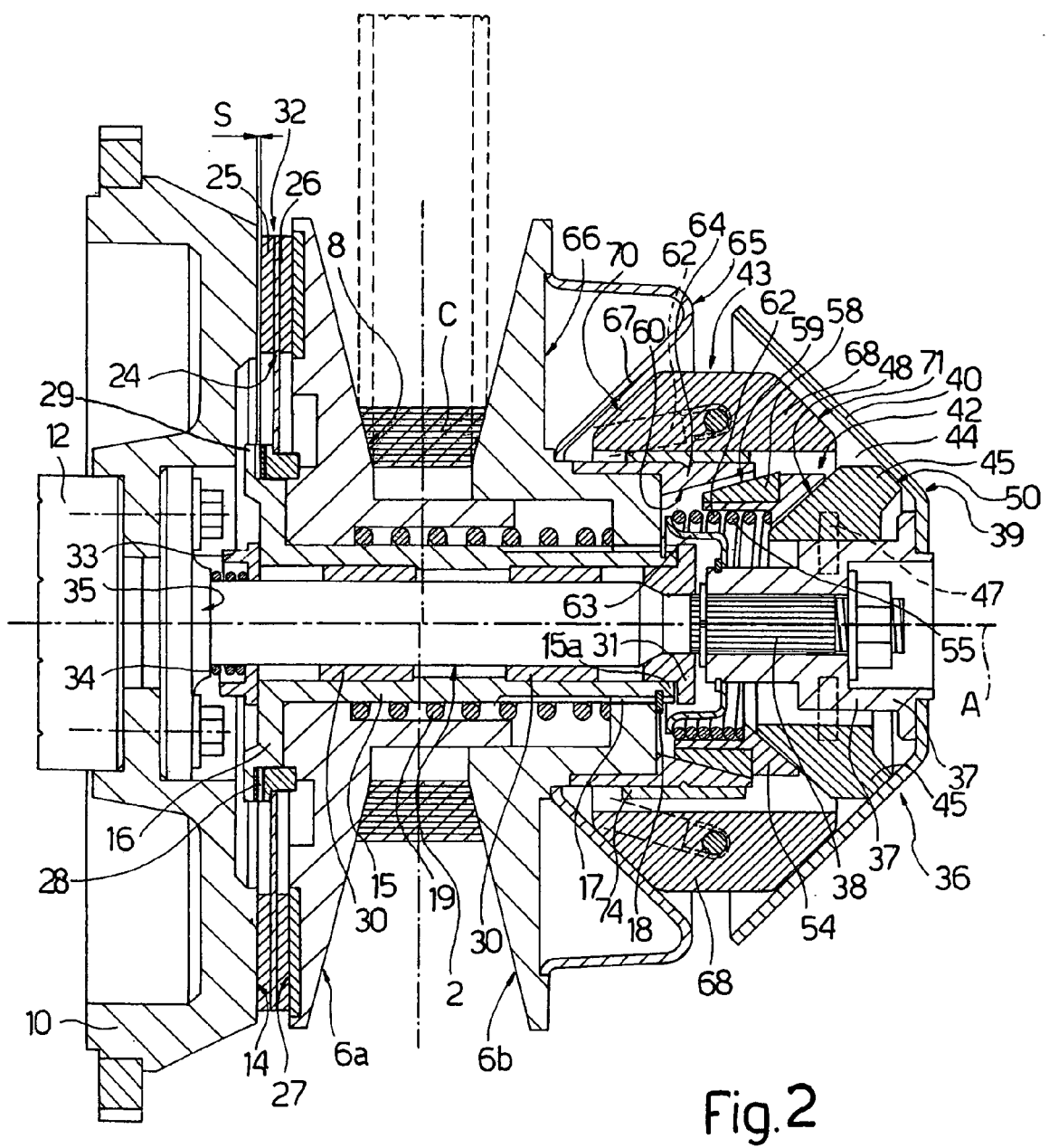
FIG. 2 shows an axial section of a drive assembly of the FIG. 1 drive, the top and bottom halves of which show two operating conditions.
Figure 3:
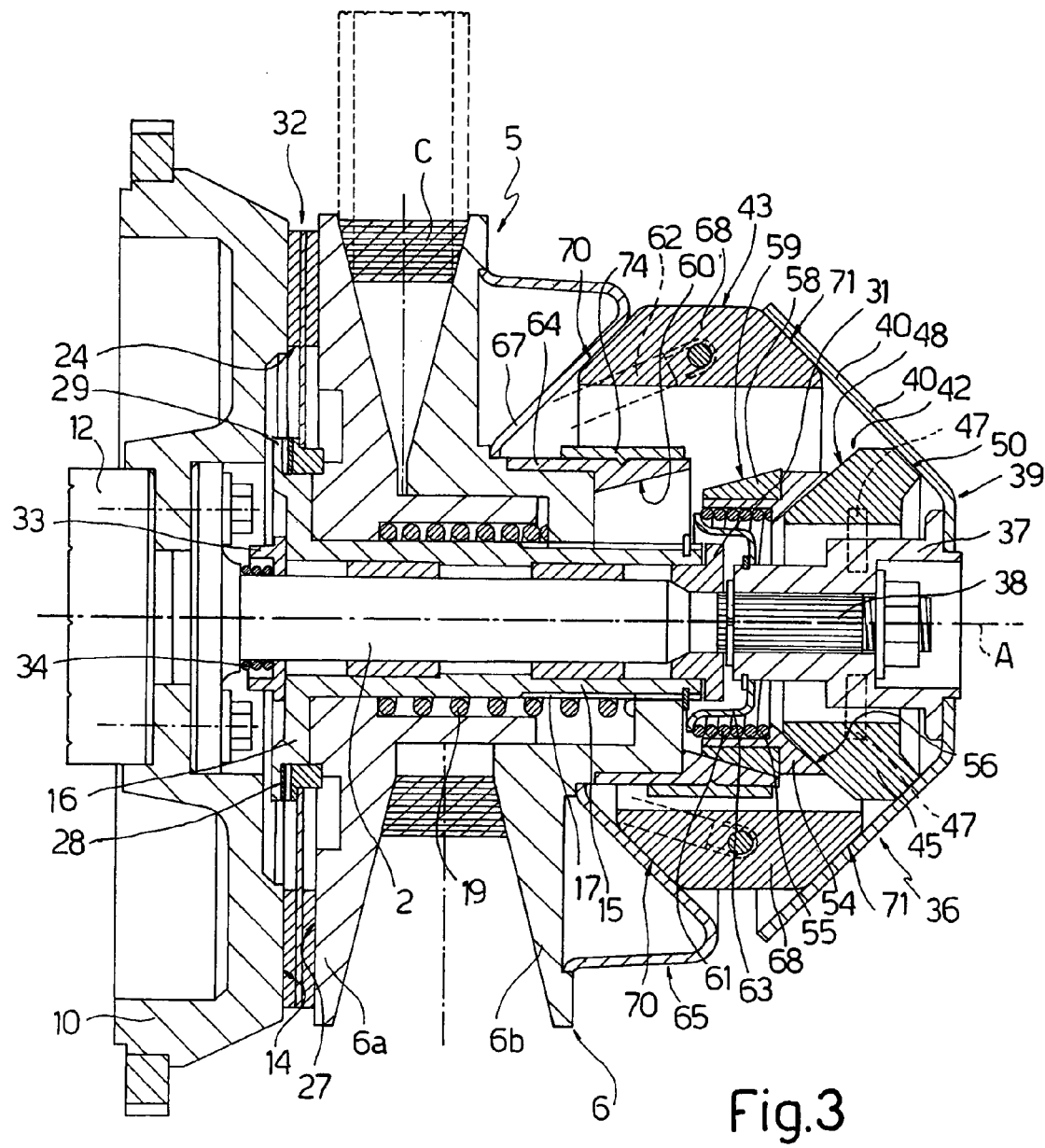
FIG. 3 shows the same axial section as in FIG. 2, and the top and bottom halves of which show two operating conditions.

Axial slide of drive assembly 5 on input shaft 2 and of movable half-pulley 6b on sleeve 15 is controlled respectively by an actuating device 42 and a speed adjusting device 43, which together define an automatic mechanical centrifugal control assembly 36 shown in FIGS. 2 to 4.

Actuating device 42 comprises a hub 37 fixed rigidly to the end 38 of input shaft 2 opposite flywheel 10. A free end of hub 37 is fitted with a substantially cup-shaped reaction disk 39 having a conical lateral wall 40 extending towards movable half-pulley 6b so as to surround, and form a cavity 44 with, hub 37.

Cavity 44 houses three auxiliary sector-shaped weights 45 (FIGS. 8, 9, 10) surrounding hub 37 and forming, in pairs, radial gaps 46, one of which is shown in FIG. 4. Weights 45 as a whole are shown schematically by the dot-and-dash line in FIG. 5. Three radial drive pins 47, projecting from hub 37 and equally spaced 1200 apart, engage respective gaps 46 between auxiliary weights 45 to rotate the weights.

Each auxiliary weight 45 is bounded at the end facing drive assembly 5 by a surface 48 sloping substantially 45°, and along the centreline of which is formed a radial recess 49 for the purpose explained later on. On the axially opposite side to surface 48, each auxiliary weight has a peripheral bevel 50 having a conical profile matching the inner profile of lateral wall 40 of reaction disk 39.

Auxiliary weights 45 cooperate with an actuating ring 54, shown in detail in FIGS. 5, 6 and 7, which is coaxial with hub 37, is loaded by a spring 55 towards auxiliary weights 45, and has a conical end surface 56 with a profile matching that of end surfaces 48 of the weights. Three raised radial ribs 57 are formed on surface 56, and engage (FIG. 4) respective recesses 49 on auxiliary weights 45 to connect auxiliary weights 45 prismatically to actuating ring 54.

Actuating ring 54 has a friction seal 58 having a conical friction surface 59 facing and tapering the axially opposite way to the auxiliary weights, i.e. towards drive assembly 5.

Friction surface 59 axially faces a matching friction surface 60 formed inside a tubular sleeve 64 projecting axially inside cavity 44 of movable half-pulley 6b and fixed rigidly to movable half-pulley 6b. Sleeve 64 is surrounded by a bushing 74 of soft material, for the purpose explained later on.

Actuating ring 54 defines a push member of actuating device 42, and is subjected to the axial thrust of spring 55 interposed between ring 54 and a plate 63 fixed to input shaft 2. Spring 55 has the dual function of keeping actuating ring 54, and in particular friction surface 59 of seal 58, detached from friction surface 60 of sleeve 64, and of keeping auxiliary weights 45 in a rest position contacting hub 37.

Speed adjusting device 43 comprises an annular push disk 65 fixed rigidly to a back face 66 of movable half-pulley 6b facing reaction disk 39; and push disk 65, conveniently made of pressed sheet metal, has a conical end wall 67 facing conical wall 40 of reaction disk 39, and having the same but opposite taper to that of wall 40.

Speed adjusting device 43 also comprises a number of, e.g. three, main weights 68 housed between walls 40 and 67 and equally spaced angularly about sleeve 64. Weights 68 have a section substantially in the form of an outwardly tapering isosceles trapezium, and are each bounded axially by two end surfaces 70 and 71 respectively facing walls 67 and 40.

Weights 68 (FIG. 4) are secured, to rotate with and slide radially with respect to movable half-pulley 6b, by respective guide tongues 73 fixed to and projecting axially from movable half-pulley 6b so as to engage respective guide grooves 75 formed in end surfaces 70 of weights 68.

Weights 68 are also secured elastically to movable half-pulley 6b by respective pairs of pull springs 62, which exert on weights 68 inward radial pull to keep them radially contacting bushing 74, and axial pull towards wall 67 of push disk 65 to prevent undesired contact between weights 68 and wall 40 of reaction disk 39.

Drive 1 operates as follows.

When the engine is idling (top half of FIG. 2), spring 34 keeps drive assembly 5 in a release position releasing friction clutch 32, i.e. with sleeve 15 resting axially against stop ring 31, and clutch disk 24 detached from flywheel 10.

Actuating device 42 rotates with input shaft 2. Auxiliary weights 45 are maintained in a radially withdrawn position, contacting hub 37, by actuating ring 54, which in turn is pushed axially by spring 55 against auxiliary weights 45, so that friction surface 59 of friction linings 58 is detached from friction surface 60 of sleeve 64.

Drive assembly 5 therefore does not rotate, and, with it, adjusting device 43 also remains stationary, with main weights 68 held in the radially withdrawn position contacting bush 74 and detached from reaction disk 39 by springs 62.

Spring 19 keeps pulley 6 in the minimum belt C work diameter condition.

As engine speed increases and reaches a predetermined threshold speed, e.g. 1200–1400 rpm, the centrifugal force of auxiliary weights 45 of actuating device 42 overcomes the elastic reaction of spring 55, and auxiliary weights 45 move radially outwards and move actuating ring 54 axially towards drive assembly 5 by the combined effect of the conical coupling of bevels 50 of weights 45 and conical wall 40 of reaction disk 39, and the conical coupling of end surfaces 48 of weights 45 and surface 56 of actuating ring 54. The engine speed at which actuating device 42 kicks in may be selected by appropriately sizing auxiliary weights 45 and spring 55.

Once the initial axial clearance is recovered, friction surface 59 of friction lining 58 on actuating ring 54 cooperates with friction surface 60 of sleeve 64 to exert axial thrust on the whole of drive assembly 5 towards flywheel 10 and in opposition to the elastic reaction of spring 34.

The axial movement of drive assembly 5 eliminates the original axial clearance S between clutch disk 24 and clutch surface 14 of flywheel 10 (bottom half of FIG. 2), so that drive assembly 5 is made integral with flywheel 10, and therefore with input shaft 2, and main weights 68 are rotated together with drive assembly 5.

In response to a further increase in engine speed, main weights 68 overcome the elastic force of springs 62 and begin to move radially outwards. Once the clearance is taken up, end surfaces 70, 71 of weights 68 exert thrust on conical wall 67 of push disk 65 and conical wall 40 of reaction disk 39. Since reaction disk 39 is fixed axially, further centrifugal radial movement of weights 68 produces an axial movement of push disk 65, and therefore of movable half-pulley 6b towards fixed half-pulley 6a, in opposition to the elastic thrust of spring 19, thus gradually reducing the width of groove 8 and increasing the work diameter of belt C (top half of FIG. 3).

When engine speed is reduced, the above operating steps are performed in reverse order. Bushing 74 of soft material provides for deadening the noise produced by main weights 68 being pulled to a stop by springs 62.

The advantages of drive 1 according to the present invention will be clear from the foregoing description.

In particular, using a centrifugal actuating device 42 for rotating drive assembly 5 over a first rotation speed threshold of input shaft 2, and a centrifugal speed adjusting device 43 for adjusting the work diameter of drive pulley 6 at higher rotation speeds of input shaft 2, provides for smooth, gradual torque transmission, with substantially no irregularity, even in low engine speed transient states, so that starting and parking the vehicle are much smoother and more gradual.

Moreover, by keeping belt C taut at all times, even in the minimum work diameter condition, and preventing half-pulleys 6a, 6b from rotating with respect to each other, there is substantially no slippage of the belt with respect to drive pulley 6 hen starting, thus reducing wear of the belt.

Clearly, changes may be made to drive 1 as described herein without, however, departing from the scope of the accompanying claims.

The invention claimed is:

1. An automatic mechanically controlled continuously-variable-ratio drive (1), comprising an input shaft (2); a flywheel (10) integral with the input shaft; a drive assembly (5) idle with respect to the input shaft (2) and having a drive pulley (6) defined by two half-pulleys (6a, 6b) defining a groove (8) of variable size for a V belt (C); friction clutch means (32) interposed between at least one of said half-pulleys (6a, 6b) and said flywheel (10); and a centrifugal control assembly (36) a centrifugal actuating device (42) controlling said clutch means (32 and a centrifugal speed adjusting device (43) for adjusting the size of the groove (8) of the drive pulley (6) in response to variations in the speed of said input shaft (2); said centrifugal actuating device (42) including a number of auxiliary centrifugal weights (45) connected in a rotationally rigid manner to said inout shaft (2), and controlling said clutch means (32) so as to set said clutch means (32) to a torque transmission condition in response to an angular speed value of said inout shaft (2) above a first threshold value and connect said drive pulley (6) angularly to said flywheel (10); said speed adjusting device (43) including a number of main centrifugal weights (68) controlling the size of the groove (8) of the drive pulley (6) and active over a second threshold value of the angular speed of the input shaft (2) higher than said first threshold value.

2. A drive as claimed in claim 1, wherein said half-pulleys (6a, 6b) are angularly fixed with respect to each other.

3. A drive as claimed in claim 1, wherein said drive assembly (5) comprises a sleeve (15) fitted in axially and angularly free manner to said input shaft (2); a first of said half-pulleys (6a) being fixed with respect to said sleeve (15); and a movable second of said half-pulleys (6b) being fitted in axially movable but angularly fixed manner to said sleeve (15).

4. A drive as claimed in claim 3, wherein said drive assembly (5) comprises stop means (18) for the movable said second half-pulley (6b), defining a maximum parting position from said first half-pulley (6a), in which said belt (C) cooperates, with no axial slack, with both said half-pulleys (6a, 6b) and is maintained taut; and elastic means (19) for forcing said second half-pulley (6b) into said position.

5. A drive as claimed in claim 3, wherein said clutch means (32) comprise a clutch disk (24) interposed axially between said first half-pulley (6a) and said flywheel (10).

6. A drive as claimed in claim 3, wherein said actuating device (42) comprises a push member (54) interposed between said auxiliary weights (45) and said drive assembly (5) and controlled by said auxiliary weights (45) to move said drive assembly (5) towards said flywheel (10) and grip said clutch disk (24) between said flywheel (10) and said first half-pulley (6a).

7. A drive as claimed in claim 6, comprising a reaction disk (39) integral with the input shaft (2) and having a conical wall (40); said speed adjusting adjusting device (43) comprising a push disk (65) having a conical wall (67) facing said conical wall (40) of said reaction disk (39), said main weights (68) having respective conical end surfaces (70, 71) cooperating with said conical walls (40, 67) to move said push disk (65) axially towards said flywheel (10) by virtue of the radial movement of said main weights (68).

8. A drive as claimed in claim 7, wherein said push member of said actuating device (42) is defined by an actuating ring (54) having a conical surface (56) facing said conical wall (40) of said reaction disk (39); said auxiliary weights (45) having respective conical end surfaces (48, 50) cooperating respectively with said conical surface (56) of said actuating ring (54) and said conical wall (40) of said reaction disk to move said actuating ring (54) axially towards said drive assembly (5) by virtue of the radial movement of said auxiliary weights (45).

* * * * *